United States Patent
Maier et al.

(10) Patent No.: US 6,891,716 B2
(45) Date of Patent: May 10, 2005

(54) CAPACITOR

(75) Inventors: Jörg-Rudolf Maier, Heidenheim (DE); Hans-Georg Keck, Heidenheim (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 10/432,449

(22) PCT Filed: Nov. 20, 2001

(86) PCT No.: PCT/DE01/04351
§ 371 (c)(1),
(2), (4) Date: Dec. 11, 2003

(87) PCT Pub. No.: WO02/41344
PCT Pub. Date: May 23, 2002

(65) Prior Publication Data
US 2004/0075969 A1 Apr. 22, 2004

(30) Foreign Application Priority Data
Nov. 20, 2000 (DE) .......................... 100 57 488

(51) Int. Cl.[7] ............................... H01G 9/00
(52) U.S. Cl. ................. 361/523; 361/516; 361/525; 361/528; 361/529; 361/530; 29/25.03
(58) Field of Search ................. 361/523, 525, 361/528, 529, 530, 302, 303, 516, 519, 532, 508, 509, 511; 29/25.03

(56) References Cited

U.S. PATENT DOCUMENTS

| | | |
|---|---|---|
| 5,150,193 A | 9/1992 | Yasuhara et al. |
| 5,781,401 A | 7/1998 | Tomiyasu et al. |
| 6,036,734 A | 3/2000 | Taketani et al. |
| 6,324,051 B1 * | 11/2001 | Igaki et al. .................. 361/523 |
| 6,333,844 B1 * | 12/2001 | Nakamura .................. 361/523 |
| 6,493,213 B1 * | 12/2002 | Clasen et al. ............... 361/528 |

FOREIGN PATENT DOCUMENTS

| | | |
|---|---|---|
| DE | 198 46 936 C1 | 3/2000 |
| JP | 04015947 A | 1/1992 |
| JP | 08124804 A | 5/1996 |
| JP | 09180964 A | 7/1997 |
| JP | 09213570 A | 8/1997 |

OTHER PUBLICATIONS

Translation of International Preliminary Examination Report for PCT/DE01/04351.

* cited by examiner

*Primary Examiner*—Anthony Dinkins
*Assistant Examiner*—Nguyen T. Ha
(74) *Attorney, Agent, or Firm*—Fish & Richardson P.C.

(57) ABSTRACT

A capacitor includes an anode body, a dielectric layer adjacent to the anode body, a cathode layer adjacent to the dielectric layer, and an enclosure that substantially encloses the anode body, the dielectric layer, and the cathode body. The enclosure has an upper side and an underside and is made of a castable material. The capacitor includes an anode contact having a contact section on the underside of the enclosure, an anode conductor that connects the anode body to the anode contact, and a cathode conductor that contacts the cathode layer and that exits the enclosure. The cathode conductor is a plate having holes at a portion of the cathode conductor inside the enclosure. The holes are at least partially filled with castable material.

7 Claims, 2 Drawing Sheets

CAPACITOR

CROSS-REFERENCE TO RELATED APPLICATIONS

This application claims priority to PCT Application No. PCT/DE01/04351, filed on Nov. 20, 2001, and to German Patent Application No. 100 57 488.2, filed on Nov. 20, 2000.

FIELD OF THE INVENTION

The invention relates to a capacitor having a capacitance, an anode body with a dielectric layer, and a cathode layer. The capacitance, anode body, and cathode layer are located inside an enclosure, which is comprised of an upper side and an underside. The capacitor also includes an anode conductor that contacts the anode body and that is connected to an anode contact. The anode contact includes a contact section provided on the underside of the enclosure. The capacitor also includes a cathode conductor, which contacts the cathode layer.

BACKGROUND

Publication DE 198 46 936 C1 features capacitors of the type noted above that are tantalum electrolyte capacitor chips. Such prior art capacitors feature a cathode conductor that is bent multiple times inside the capacitor enclosure.

Furthermore, in prior art capacitors, a tantalum wire is sintered into the anode body, which is welded to an anode end wire. The welding is located inside the enclosure.

For many applications in the automotive field and in mobile telephony, capacitors are desired that have a very high specific charge (CV product) and a very small exterior size. To produce increasingly higher C×V values for a given enclosure size, it may be possible to use high-capacitance capacitor powder for the anode body, or to increase the capacitor's effective usable volume.

In terms of usable volume, prior art capacitors have a disadvantage in that multiple bending of the cathode conductor inside the enclosure takes up a substantial amount of volume of the enclosure for the cathode conductor. The welded connection between the tantalum wire and the anode end wire also takes up a substantial amount of the enclosure volume. In terms of the exterior dimensions of the enclosure, only a relatively small anode body of a given size can be installed in the enclosure, which, accordingly, also has a small capacitance and/or a small CV product.

Publication JP 08 124 804 AA describes a capacitor of the type noted above, in which the anode conductor exits the enclosure in a straight line from the upper side of the anode body. The anode conductor is also welded with an anode contact plate, which is multiply bent inside the enclosure. This capacitor has the disadvantage of requiring a relatively large enclosure volume in order for the anode body to guide the cathode conductor and/or the anode conductor away from the underside of the enclosure. Consequently, such prior art capacitors have a low usable volume.

SUMMARY

The goal of this invention is therefore to provide a capacitor with increased usable volume.

This invention achieves this goal by a capacitor according to claims 1 and 2. Advantageous embodiments of the invention can be found in the subsequent claims.

A capacitor is described herein, which has a capacitance, an anode body with a dielectric layer, and a cathode layer. The capacitor is inside an enclosure, the enclosure having an upper side and an underside. The capacitor includes an anode conductor, which contacts the anode body and which is connected to an anode contact containing a contact section arranged on the underside of the enclosure. The capacitor also includes a cathode conductor that contacts the cathode layer and that exits the enclosure.

The cathode conductor may be a plate that features holes inside the enclosure. The enclosure may be manufactured from a moldable material that fills the holes of the plate, resulting in a close connection between the cathode conductor and the enclosure.

Especially advantageous embodiments include a capacitor whose cathode conductor is fixed to the upper side of the capacitance. The cathode conductor runs in a straight line inside the enclosure and exits the enclosure in a straight line. Outside the enclosure, the cathode conductor is electrically connected to a cathode contact arranged on the underside of the enclosure.

The capacitor has an advantage in that plate holes filled with the enclosure material create a close connection between the enclosure material and the cathode conductor. As a result, a minimum wall thickness on the upper side of the enclosure is required to securely fix the cathode conductor and/or for the cathode conductor to securely exit the enclosure. This is an effective way to increase the capacitor's usable volume.

The capacitor has the additional advantage of decreasing the danger of destroying the upper side of the enclosure through flexural forces should the cathode conductor be subsequently bent after completion of the enclosure.

The anode conductor can be a wire that laterally exits the inside of the anode body. Such a wire can be, e.g., a tantalum wire that is connected to tantalum powder, which is molded around the wire and then sintered. This creates a porous sintering anode body, which enables creation of a capacitor with very high capacitance.

Furthermore, inside the enclosure, the anode contact comes into contact with an anode conductor. The anode conductor preferably exits the enclosure from the side of the enclosure opposite the cathode conductor and at a height that essentially corresponds to the height at which the cathode conductor exits the enclosure. Preferably, the connection between the anode conductor and the anode contact can be produced via welding.

A capacitor is also described that has a capacitance, an anode body with a dielectric layer, and a cathode layer, and that is enclosed by an enclosure with an upper side and an underside. The capacitor also includes an anode conductor that contacts the anode body and that is connected to an anode contact. The anode contact has a contact section arranged on the underside of the enclosure and a cathode conductor that contacts the cathode layer. The cathode layer runs in a straight line inside the enclosure and exits the enclosure in a straight line. Outside the enclosure, the cathode conductor is electrically connected to a cathode contact disposed on the underside of the enclosure. The anode conductor and the anode contact of the capacitor are integral components of an anode plate. The anode plate laterally exits the inside of the anode body and has an end section that runs along the underside of the enclosure to form a contact section. The cathode conductor can be fixed to the upper side of the capacitance.

Such a capacitor is advantageous since a weld is not required inside the enclosure between an anode conductor and an anode plate. Thus, the enclosure walls can be thinner, thereby increasing the usable volume of the capacitor.

Such a capacitor also has the advantage of being relatively simple to produce. Production may occur by applying tantalum paste to a tantalum plate, followed by sintering. It is no longer necessary to mold a powder around a wire. An anode conductor in the form of a plate also has the advantage of creating a large contact surface between the anode conductor and the anode body, making it possible to effectively reduce the internal resistance of the capacitor. Preferably, the anode plate runs inside the enclosure in a straight line and is bent around the enclosure on the outside thereof. The end section of the anode plate runs along the underside of the enclosure, where it forms the contact section.

If necessary, the contact section formed by the anode plate can be made solderable. For example, tantalum or niobium can be used as material for the anode conductor. These materials are relatively difficult to solder. For example, the contact section running on the underside of the enclosure can be made solderable by attaching a metallic layer.

Such a capacitor also has the advantage of using fewer individual components, thus eliminating the need for a number of materials and, e.g., the resulting expense of soldering the anode conductor and anode contact.

An especially compact design can be achieved in one embodiment of the inventive capacitor by using, for the cathode conductor, a plate that is bent along the outside of the enclosure and that has the end section of the cathode conductor running along the underside of the enclosure to form the cathode contact.

Such a design of the inventive capacitor has the advantage of making it possible to provide an SMD-ready capacitor using a cathode contact on the underside of the enclosure.

Because there is no need to bend the cathode conductor inside the enclosure, the capacitor has the advantage of providing a very high usable volume inside the enclosure. As a result, at a given enclosure size, an anode body with a large capacitance and/or a correspondingly large C×V value can be installed. Conversely, at a given C×V value, the capacitor can be made smaller. Therefore, at a constant CV product, the inventive capacitor requires less space. The reduction of the space requirement relates in particular to the resulting lateral extension; i.e., the extension of the capacitor parallel to the upper and undersides of the enclosure.

It is also advantageous for the capacitor if the anode conductor is a wire that exits the inside of the anode body laterally, and if the anode contact contacts the anode conductor inside the enclosure and exits at essentially the same height as the cathode conductor exits the enclosure.

Exiting the cathode conductor and the anode conductor at essentially the same height of the enclosure has the advantage of simplifying the manufacture of the enclosure. For example, the enclosure can be manufactured by injecting the capacitance with epoxy resin. Normally, two injection molds, each with a recess, are placed on top of each other in such a way as to produce a cavity that provides the shape of the enclosure to be manufactured. At the contact point between the two injection molds, the cathode conductor and/or the anode conductor can exit from the enclosure to be manufactured between the injection molds. If the cathode conductor and the anode conductor exit from the enclosure at the same height, injection molds with a simple geometry, in particular with flat surfaces, can be used.

In another embodiment, a capacitor is manufactured by injecting a capacitance provided with an anode conductor and a cathode conductor with a moldable material forming an enclosure, followed by bending the cathode conductor exiting the enclosure and the anode contact exiting the enclosure. This type of capacitor has the advantage that it can be manufactured simply using a standard process. Also, such a capacitor has the advantage that the enclosure will not be destroyed even if it is bent.

It is also advantageous if the capacitor has a mounting surface on the underside of the enclosure whose height in relation to the anode contact and/or in relation to the cathode contact is chosen in such a way that it is suitable for affixing the enclosure to a circuit board using a surface mounting technique. Such a capacitor has the advantage of being able to be used as an SMD (surface mounted device).

A suitable arrangement of the mounting surface on the underside of the enclosure in relation to the anode contact and/or in relation to the cathode contact could, for example, include having the mounting surface on the same level as the underside of the cathode contact and the underside of the anode contact. Advantageously, the above can be achieved by designing the underside of the enclosure as a step, whereby the contacts (anode contact and/or cathode contact) are arranged in sections of the underside of the enclosure opposite a circuit board.

It is also advantageous if the capacitor does not exceed the following dimensions: length=6.0±0.3 mm, width=3.2±0.3 mm, and height=1.5 mm. In order not to exceed this height, it is advantageous to design the enclosure over the cathode conductor to have a thickness of <0.2 mm.

By not exceeding the maximum height, such a capacitor has the advantage of complying with the "Low Profile C" standard structure. In particular, as a result of dispensing with bending the cathode conductor, a large portion of the length of the capacitor can be used for the capacitance.

The following describes the invention in greater detail on the basis of exemplary embodiments and related figures.

DETAILED DESCRIPTION

Figure 1:
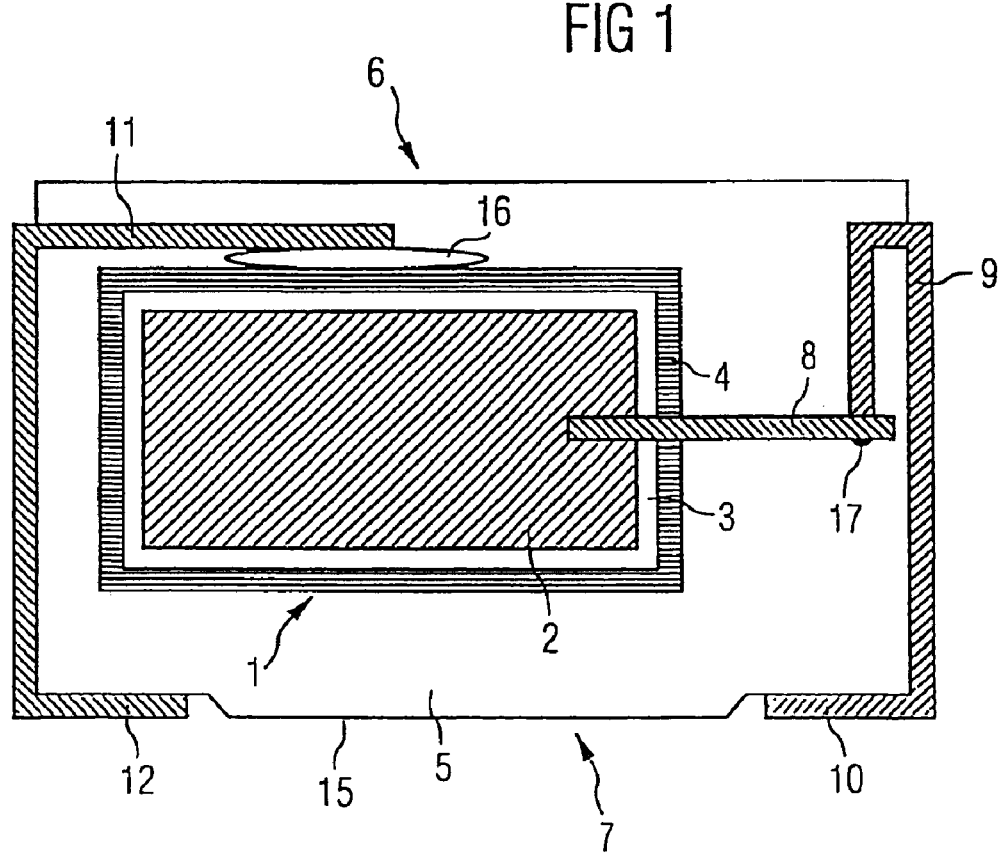
FIG. 1 shows a cross-sectional view of an example of a capacitor according to the invention.

FIG. 1 shows a capacitor with a capacitance 1. An anode body 2, a dielectric layer 3 and a cathode layer 4 form the capacitor. Anode body 2 is a porous sintered body containing tantalum. The sintered body is enclosed by a dielectric layer 3 containing tantalum. Dielectric layer 3 is, in turn, enclosed by a cathode layer 4, which is comprised of graphite. Capacitance 1 is enclosed by an enclosure 5, which is comprised of an upper side 6 and a underside 7. Enclosure 5 is comprised of epoxy resin and is manufactured using injection molding.

The capacitor shown in FIG. 1 features an anode conductor 8, which contacts anode body 2. Anode conductor 8 is a tantalum wire that is partially molded by the tantalum powder of anode body 2. Anode conductor 8 also exits laterally from anode body 2 and is connected to an anode contact 9, which is a plate comprised of a nickel/iron alloy. This plate is made solderable through use of a copper or tin/lead coating.

The invention can be realized with any material that can produce a suitable porous sintered body, and is not limited to tantalum.

Anode contact 9 features a contact section 10 that is arranged on underside 7 of enclosure 5. Also, a cathode conductor 11 is electrically fixed to cathode layer 4 via a conductive adhesive 16. Cathode conductor 11 is a plate made of an iron/nickel alloy that is made solderable via a suitable coating. However, any suitable material that is electrically conductive and solderable can be used.

Cathode conductor 11 contacts cathode layer 4, and is at the same time fixed to cathode layer 4. Cathode conductor 11 is straight and exits enclosure 5 laterally. That is, cathode conductor 11 runs straight within enclosure 5 and has no bends or curves. Outside enclosure 5, cathode conductor 11 is bent downward around enclosure 5 along enclosure 5 and forms a cathode contact 12 on the underside of enclosure 5. This cathode contact is suitable for soldering the capacitor to a circuit board.

The invention is not limited to tantalum systems, but can be realized with all other appropriate types of metals.

Anode contact 9 is fixed to anode conductor 8 by welding, which creates a welding bead 17. Underside 7 of enclosure 5 is again stepped inward in such a way that an adhesive surface 15 is created. The adhesive surface can be used to affix the capacitor onto a circuit board using a surface mounting technique, after which a soldering process, such as flow soldering, takes place.

Figure 2:
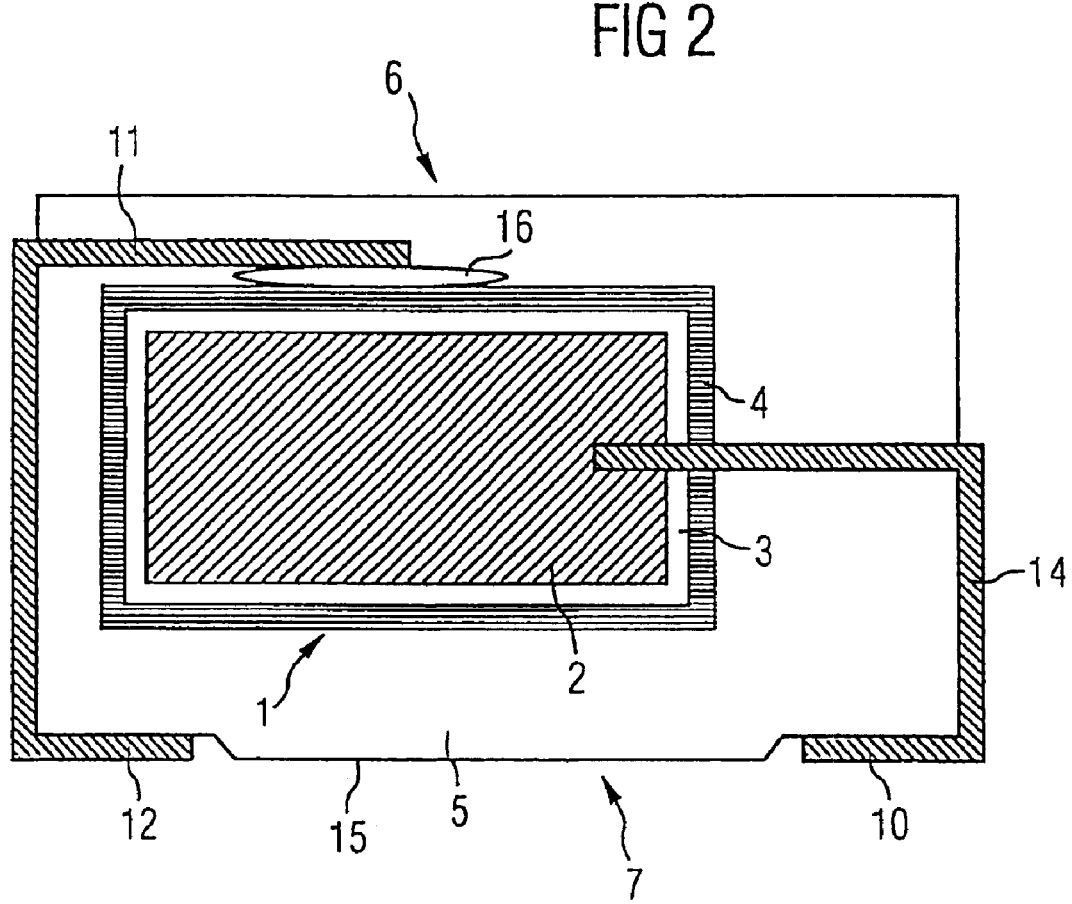
FIG. 2 shows another cross-sectional view of an example of a capacitor according to the invention.

The capacitive element shown in FIG. 2 largely corresponds to the capacitive element shown in FIG. 1. There is, however, a difference in the design of the anode conductor between the capacitive elements of FIGS. 1 and 2. The anode conductor according to FIG. 2 is combined with an anode plate 14 in one piece that contacts anode body 2. Anode plate 14 can be a tantalum plate, for example, when using an anode body made of tantalum. The tantalum plate can be coated with a tantalum paste and then sintered, thereby producing anode body 2.

Anode plate 14 exits the inside of anode body 2 laterally, runs inside enclosure 5 in a straight line, and bends around enclosure 5. As a result, when compared to the element shown in FIG. 1, the element shown in FIG. 2 saves more space in a lateral direction, because no additional bends are necessary inside the enclosure 5. The end section of anode plate 14, on underside 7 of enclosure 5, forms contact section 10. Contact section 10 is suitable for soldering the capacitor to a circuit board.

Figure 3:
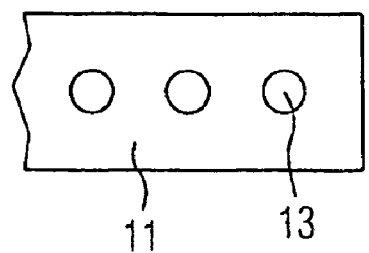
FIG. 3 shows a cathode conductor for use in a capacitor according to the invention.

FIG. 3 shows the design of a cathode conductor 11 comprised of a plate that contains holes 13. Holes 13 can be filled by injecting the capacitance with epoxy resin or another moldable material, thus improving the mechanical stability of the cathode conductor 11 within the enclosure.

The invention is not limited to the example embodiments shown; rather, it is defined in its most general form by claim 1.

What is claimed is:

1. A capacitor comprising:
   an anode body;
   a dielectric layer adjacent to the anode body;
   a cathode layer adjacent to the dielectric layer;
   an enclosure that substantially encloses the anode body, the dielectric layer, and the cathode layer, the enclosure having an upper side and an underside, the enclosure being comprised of a moldable material;
   an anode contact having a contact section on the underside of the enclosure;
   an anode conductor that connects the anode body to the anode contact, at least a portion of the anode conductor being inside the enclosure; and
   a cathode conductor that contacts the cathode layer and that exits the enclosure, the cathode conductor comprising a plate having holes at a portion of the cathode conductor that is inside the enclosure, the holes being at least partially filled with the moldable material.

2. The capacitor of claim 1, wherein the cathode conductor bends around an outside surface of the enclosure, a portion of the cathode conductor on the underside of the enclosure forming a contact section.

3. The capacitor of claim 1, further comprising a material that fixes the cathode conductor to an upper side of the cathode layer adjacent to the upper side of the enclosure.

4. The capacitor of claim 1, wherein the anode conductor comprises a wire that exits laterally from inside of the anode body.

5. The capacitor of claim 1, wherein the anode contact and the cathode conductor exit the enclosure at substantially a same height relative to the underside of the enclosure.

6. The capacitor of claim 1, wherein the underside of the enclosure comprises a mounting surface for fixing the enclosure to a circuit board.

7. The capacitor of claim 1, wherein the capacitor does not exceed the following dimensions: length=6.0±0.3 mm, width=3.2±0.3 mm, and height=1.5 mm.

* * * * *